Figure 12:
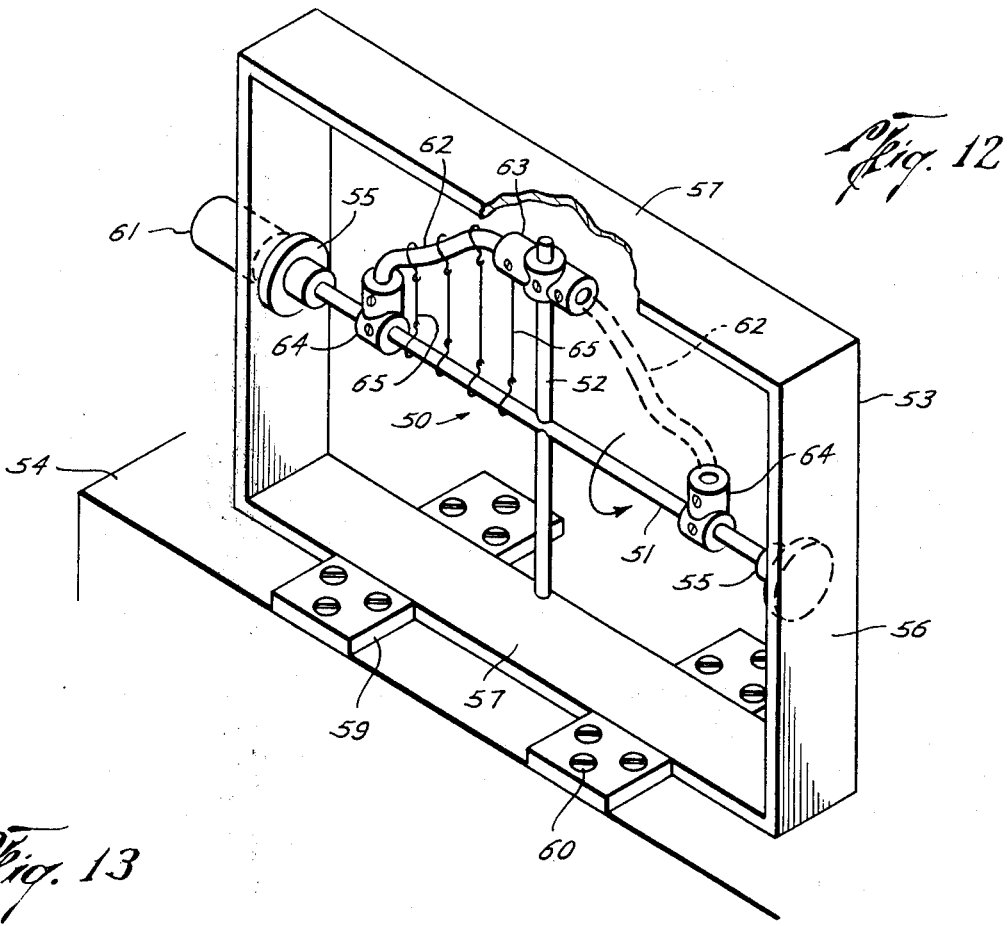

United States Patent [19]

Nasir

[11] 3,995,380
[45] Dec. 7, 1976

[54] VISUAL AID
[76] Inventor: Nadim E. Nasir, 4066 Aberdeen Way, Houston, Tex. 77025
[22] Filed: Aug. 20, 1975
[21] Appl. No.: 606,294
[52] U.S. Cl. .................................. 35/34; 35/73
[51] Int. Cl.$^2$ ................................. G09B 23/04
[58] Field of Search ......... 35/24 R, 30, 31 R, 31 A, 35/31 C, 31 D, 34, 46 A, 72, 73, 22 R; 273/153 P

[56] References Cited
UNITED STATES PATENTS

| | | | |
|---|---|---|---|
| 270,225 | 1/1883 | Kennedy | 35/72 |
| 538,261 | 4/1895 | Kennedy | 35/72 |
| 595,455 | 12/1897 | Glidden | 35/72 |
| 600,610 | 3/1898 | Cowles | 35/72 |
| 639,941 | 12/1899 | Diehl | 35/72 |
| 983,730 | 2/1911 | Leach | 273/153 P X |
| 1,192,483 | 7/1916 | Wheeler | 35/72 |
| 1,535,706 | 4/1925 | Wooster | 35/72 |
| 1,739,861 | 12/1929 | Roberts | 35/46 A |
| 2,595,938 | 5/1952 | Grant | 273/153 P X |
| 3,449,841 | 6/1969 | Sveda | 35/22 R |

FOREIGN PATENTS OR APPLICATIONS

| | | | |
|---|---|---|---|
| 199,206 | 1/1939 | Switzerland | 35/31 D |
| 25,370 | 12/1901 | United Kingdom | 35/72 |

Primary Examiner—Richard J. Apley
Attorney, Agent, or Firm—W. F. Hyer; Marvin B. Eickenroht

[57] ABSTRACT

There are disclosed several embodiments of a visual aid for use in teaching calculus, each having in common a support means defining X and Y axes, and means mounted on the support means to describe a geometrical shape which is generated by the revolution of an area bounded by a curve about one of the axes.

9 Claims, 14 Drawing Figures

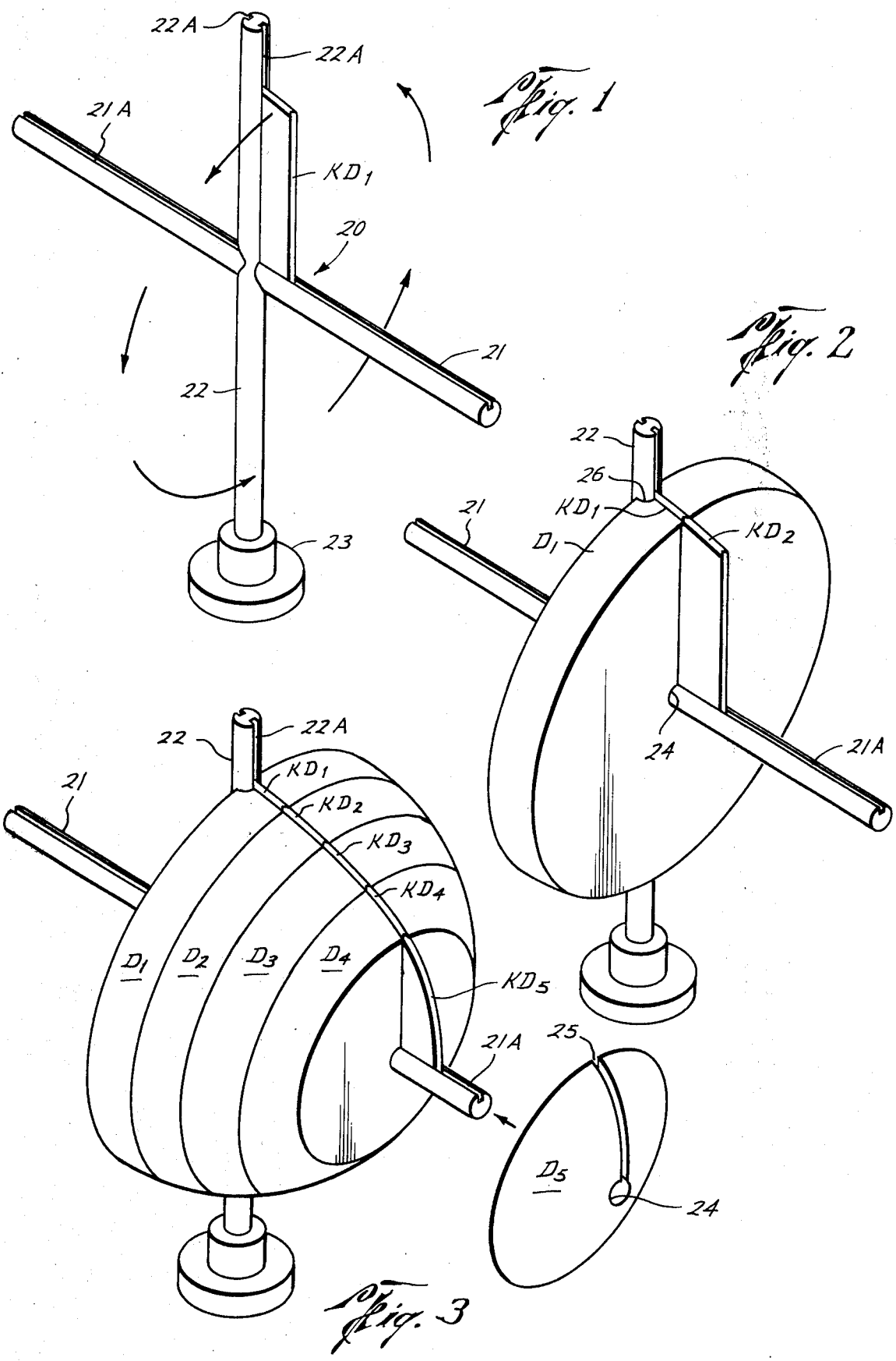

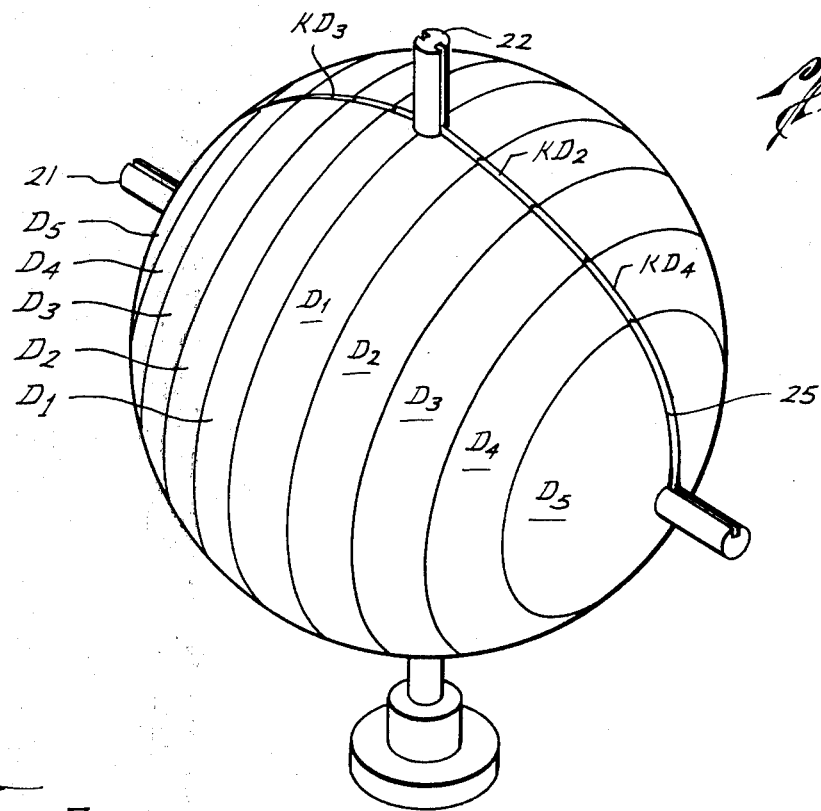
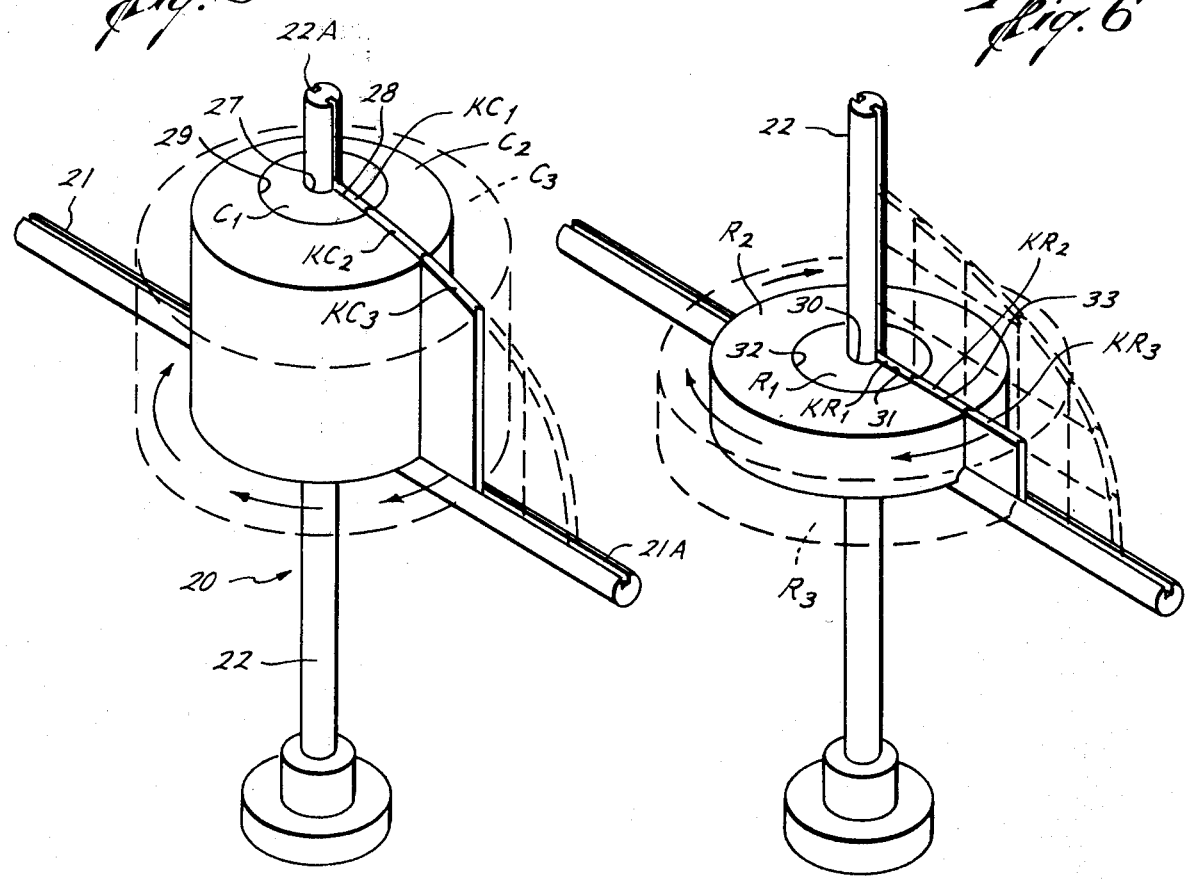

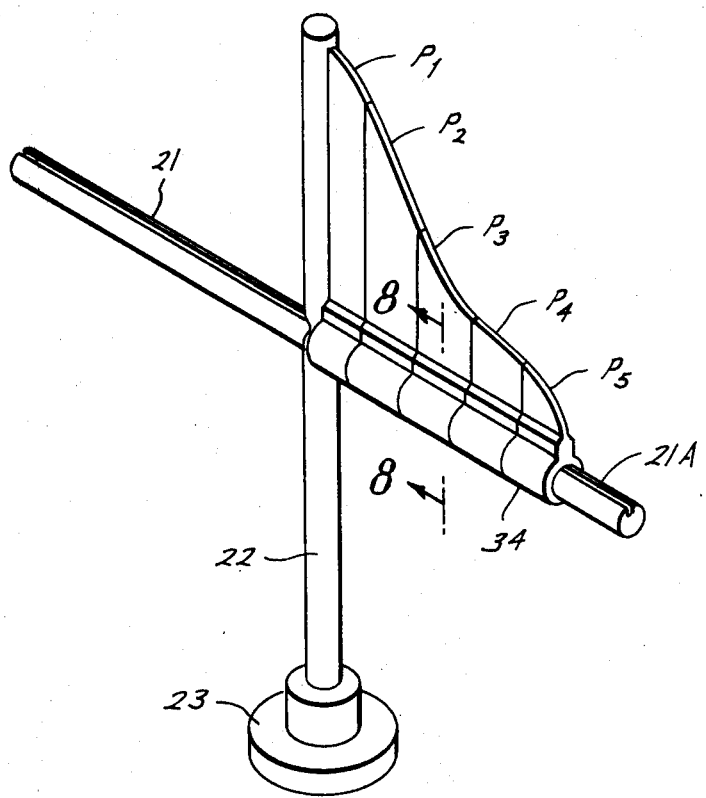
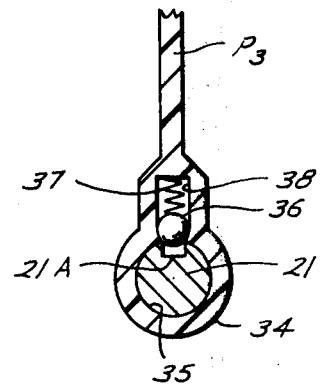

U.S. Patent    Dec. 7, 1976    Sheet 4 of 5    3,995,380
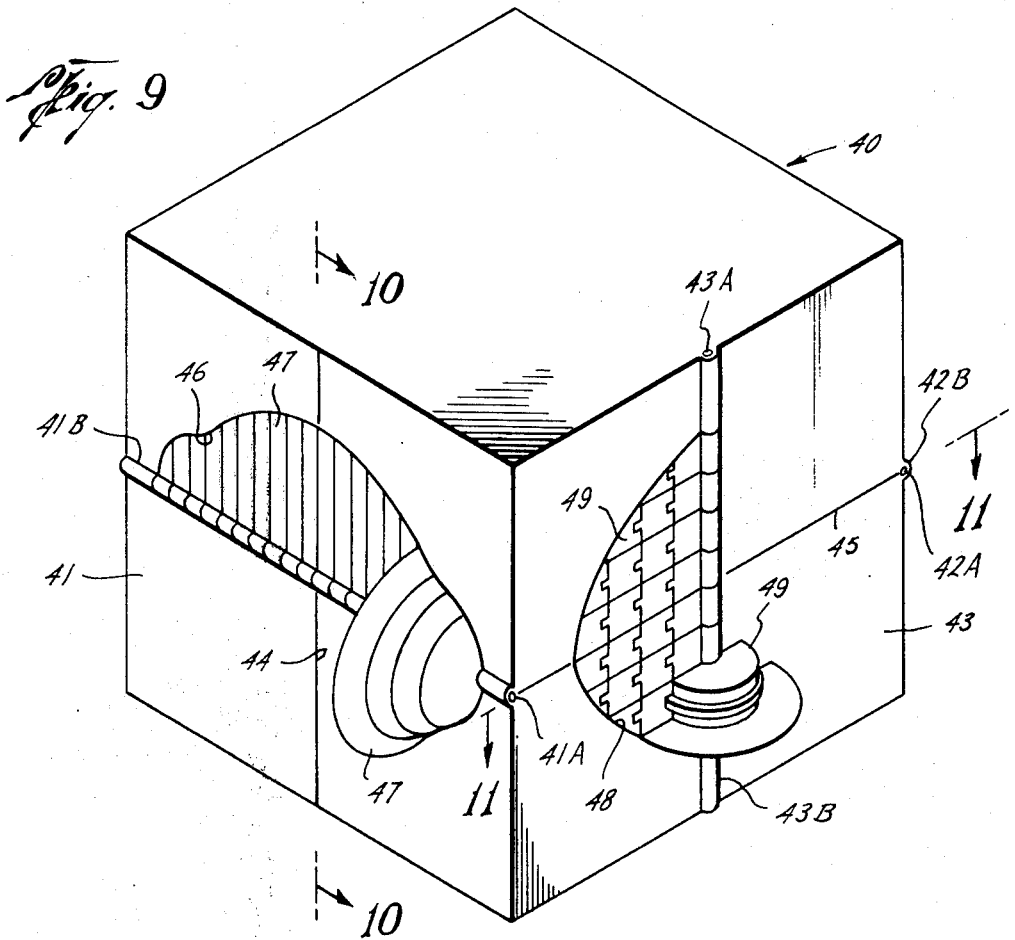
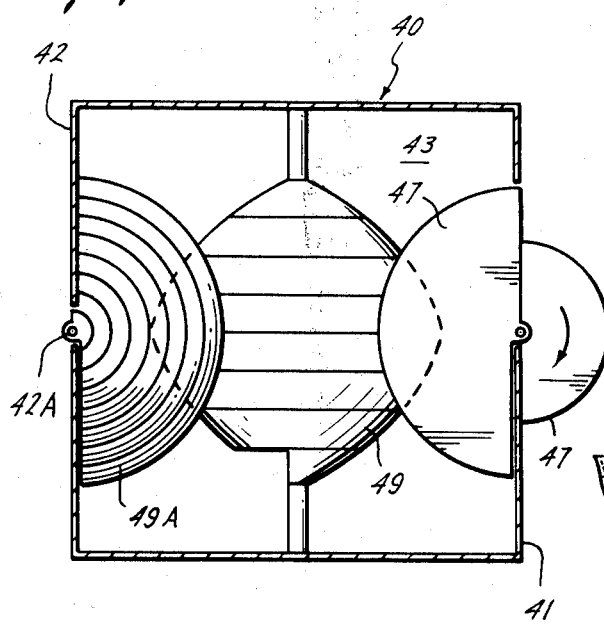
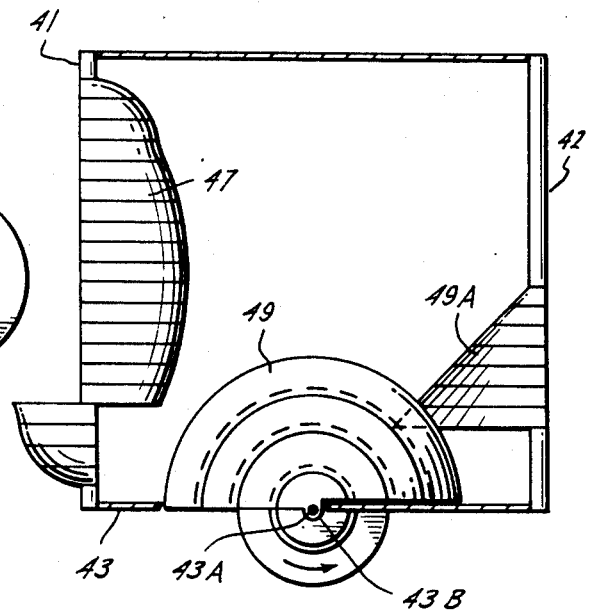

VISUAL AID

This invention relates generally to a visual aid which may be used as a teaching aid.

Students of integral calculus often have difficulty in understanding that surfaces and/or solids generated by the revolution of an area bounded by a curve about an X or Y axis are made up of segments of such surfaces and/or solids, each of which may be different from the others. This in turn makes it difficult for the student to understand the calculation of the plane area, surface area, or volume of various geometrical shapes by the use of integral calculus wherein these segments are summed. To my knowledge, there are no devices available for use as aids in teaching these concepts, and instructors must therefore resort to hand signals, or to drawings of three-dimensional figures, or to combinations of the two, none of which are entirely satisfactory.

It is therefore the primary object of this invention to provide a three-dimensional visual aid for this purpose; and, more particularly, a visual aid of this type which is easy to use and inexpensive to manufacture.

Another object is to provide such a visual aid which may be embodied in different forms best suited to illustrate particular calculations.

A further object is to provide embodiments of a visual aid of this type which may be used to alternatively illustrate different calculations, either by means of simple adjustments or interchange of parts.

These and other objects are accomplished, in accordance with the illustrated embodiments of the present invention, by a visual aid which comprises support means defining X and Y axes, and a plurality of segmental shapes mounted on the support means to describe a geometrical shape which is generated by the revolution of an area bounded by a curve about one of the axes.

In accordance with one embodiment of the invention, the X and Y axes are defined by rods which intersect at right angles, and the segmental shapes are solid bodies, such as discs, cylinders, or rings, which surround one of the rods to describe a geometrical shape generated about the axis of the rod, or, alternatively, plates which are rotatable about one of the rods whereby they describe an imaginary geometrical shape generated about the rod axis. More particularly, the different types of bodies are interchangeably mounted on the rods, depending on the calculation to be illustrated.

In another embodiment of the invention, the support means comprises a wall, with a pivot pin mounted thereon to define one axis and a line drawn thereon to define the other axis. In this embodiment, the segmental shapes are represented by bodies rotatably mounted on the pin for swinging between positions on one side or the other of the wall. Preferably, several such walls are connected as a box to provide a corresponding number of visual aids.

In still another embodiment of the invention, wherein the support means comprises rods which intersect at right angles, as in the case of the first-mentioned embodiment, one of the rods is mounted for rotation about its axis, and the segmental shapes comprise a third rod extending between the other rods of the support means, and bands which extend parallel to one another between the third rod and one of the other rods. As in the case of the second embodiment, the third rod and bands thus describe an imaginary geometrical shape generated about the axis of the one rod. Preferably, the third rod is deformable to a curve of desired shape, and the strings are elastic, whereby the geometrical shape may be modified as desired.

Figure 13:
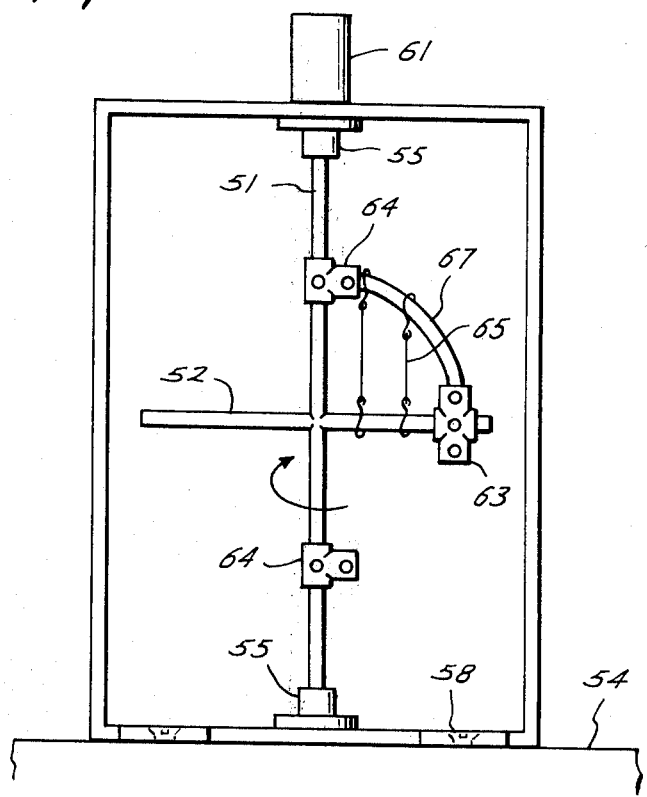
Figure 14:
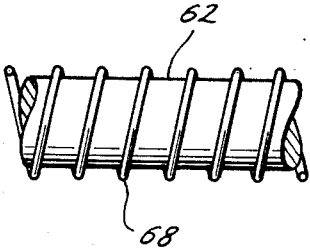

In the drawings, wherein like reference characters are used throughout to designate like parts:

FIGS. 1 to 7 are perspective views, and FIG. 8 is an enlarged partial cross-sectional view, as seen along broken line 8—8 of FIG. 7, of a visual aid constructed in accordance with the first-mentioned embodiment of the invention, wherein discs are shown in the process of being mounted on the support means in FIGS. 1 to 4, cylinders are shown mounted thereon in FIG. 5, rings are shown mounted thereon in FIG. 6, and plates are shown mounted thereon in FIGS. 7 and 8;

FIG. 9 is a perspective view, and FIGS. 10 and 11 are sectional views, as seen along broken lines 10—10 and 11—11, respectively, of FIG. 9, of a visual aid constructed in accordance with the second-mentioned embodiment of the invention; and FIGS. 12, 13, and 14, are, respectively, a perspective view, a side view, and an enlarged detailed view of a portion of a visual aid constructed in accordance with the third-mentioned embodiment of the invention.

With reference now to the details of the drawings, and particularly the embodiment of FIGS. 1 to 8, the support means thereof which is illustrated in its entirety by reference character 20, comprises intersecting rods 21 and 22, are arranged at right angles to one another. The lower end of the rod 22 is mounted in a stand or pedestal 23 to dispose it in a vertical position, and thus to dispose rod 21 in a horizontal position, whereby the horizontal rod defines an X axis and the vertical rod 22 defines a Y axis. The horizontal rod is of generally the same length on opposite sides of vertical rod 22, and the vertical rod is of substantially the same length above and below the horizontal rod 21.

Each body to be mounted on the support means is provided with a hole therethrough for slipping over the end of one of the rods, and each body is keyed to the support means so that when all are mounted thereon, they describe the intended geometrical shape. The rods of the support means are of such construction as to cooperate with means for keying any of the different forms of bodies thereto.

More particularly, a groove 21A is formed along the top side of each opposite end of the horizontal rod 21, and a groove 22A is formed on each opposite side of the upper end of rod 22, all the grooves lying in a plane which is common to the axes of the rods so that inner ends intersect. The means for keying the solid bodies shown in FIGS. 1 to 6 comprise keys which fit within one or more of the grooves in position to fit within radial slots within the bodies while the means for keying the plates of FIGS. 7 to 8 comprise detents carried by the plates for releasably fitting within groove 21A.

With reference to the use of the aid with the solid bodies of FIGS. 1 to 4, a first such alignment key $KD_1$ may be moved into a position in which its lower and left edges fit within grooves 21A and 22A. A solid body in the form of a disc $D_1$ having a hole 24 in its center is then moved onto the support means by sliding the hole 24 over the outer end of rod 21. Disc $D_1$ also has a slot 25 extending radially from its hole 24 to its outer circumference and of a width for fitting closely over the key $KD_1$ as disc $D_1$ is moved inwardly along the right end of rod 21. More particularly, the left side of disc $D_1$ has a diametrical groove 26 formed therein to intersect with the left end of slot 25 and of a radius for fitting closely about the right half of the upper and lower ends of vertical rod 22. In this way, disc $D_1$ can be moved into a mounted position on the support means in which its left side is adjacent the right side of a corresponding disc $D_1$ which is moved into mounted position over the left end of the rod 21, as shown in FIG. 4.

With disc $D_1$ so mounted, a key $KD_2$ is then mounted on the support means by insertion of its lower edge into the right end of groove 21A adjacent key $KD_1$. Preferably, the right edge of key $KD_1$ and the left edge of the key $KD_2$ are of tongue and groove configuration so as to cooperate in holding key $KD_2$ in a fixed rotational position. With key $KD_2$ so mounted, a disc $D_2$ may be moved into mounted position thereon by sliding hole 24 in its center over the end of rod 21 and causing the slot 25 therein to move closely over key $KD_2$. As will be appreciated, the adjacent faces of the discs $D_1$ and $D_2$ may be flat since neither must conform to any part of the vertical rod 22A.

Additional discs $D_3$, $D_4$ and $D_5$ may then be moved into mounted positions on the support means and interfitted with keys $KD_3$, $KD_4$ and $KD_5$, respectively, in an obvious manner. It's contemplated that the fit of the holes 24 in the discs is sufficiently tight about the rod 21, and the slots 25 therein sufficiently tight over the keys, that the discs will be held against accidental displacement from the assembled positions shown in FIG. 2. Then, of course, corresponding discs $D_1$, $D_2$, $D_3$, $D_4$ and $D_5$ may be assembled onto the support means over the left end of the rod 21, and keyed to the support means by additional keys $KD_1$, $KD_2$, $KD_3$, $KD_4$ and $KD_5$, so as to form the geometrical shape shown in FIG. 4, which is generated by the revolution about the axis X of the curve defined by the intersection of a plane through the axes with the exterior surface of the shape. As shown, the keys for mounting the discs on the suppport means correspond in length to the radial extent of the discs so that their outer edges form a smooth continuation of the geometrical shape.

As illustrated in FIGS. 5 and 6, wherein the discs have been replaced on the support means by cylinders on rings which make up other geometrical shapes, the cylinders and rings are mounted differently than the discs in that they surround the rod 22 rather than the rod 21. This, of course, illustrates the calculation of the surface and/or volume of a geometrical shape by the revolution of a curve about the Y axis, rather than the X axis.

Similarly to the discs, the cylinders of FIG. 5 are keyed to support means 20 by means of keys which fit within one or more of the grooves in the horizontal and vertical rods of the support means. Thus, key $KC_1$ has its lower and side edges fitted within the grooves 21A and 22A to support it in position to mount a cylinder $C_1$. With key $KC_1$ so mounted, a central hole 27 through cylinder $C_1$ is slid over the upper end of rod 22, and a radial slot 28 therein is slid closely over the key $KC_1$.

A second cylinder $C_2$ has a central hole 29 therein which is of a diameter slightly larger than the outer diameter of cylinder $C_1$, so that with key $KC_2$ mounted on the support means, cylinder $C_2$ may be slid downwardly over cylinder $C_1$ into the mounted position shown in FIG. 5. Thus, key $KC_2$ is similar to key $KD_2$, in that it has a lower edge which fits into the groove 21A and a left edge which has a tongue and groove connection with the right edge of aligning part key $KC_2$.

Additional cylinders, such as cylinder $C_3$ shown in broken lines in FIG. 5, may be mounted on the support means in similar manner. Thus, as shown, key $KC_3$ is adapted to have its lower edge received within the groove 21A and its left edge provided with a tongue and groove connection with the right edge of key $KC_2$ so as to dispose it in a position for receiving the radial slot in cylinder $C_3$ as a central hole therein is slid over the outer diameter of cylinder $C_2$. Still further cylinders may be mounted on and keyed to the support means concentrically of those shown in FIG. 5 in an obvious manner to form the upper half of a geometrical shape similar to that shown in FIG. 4. Also, of course, corresponding cylinders may be mounted on the support means beneath the horizontal rod 21 to form a shape which surrounds the X axis. As shown the keys used in mounting the cylinders are of heights corresponding to the axial lengths of the cylinders so that the outer edges of the keys form smooth continuations of the segmental shape.

The rings are shown in FIG. 6 to have rectangular cross sections and to be mounted on the support means 20 similarly to the cylinders of FIG. 5 in that they are arranged concentrically about the Y axis defined by rod 22. However, as compared with the cylinders, the rings are arranged in vertically and horizontally disposed sets or series extending along both the X and Y axes to illustrate another type of calculation. As shown, the outer surfaces of the outermost rings in each series form the surface of the geometrical shape. Thus, the vertical sets of rings in effect form cylinders similar to those shown in FIG. 5, and the horizontal sets in effect form discs similar to those of FIGS. 1 to 4, but disposed about the Y rather than the X axis.

Thus, with specific reference to FIG. 6, key $KR_1$ is mounted on the support means with its lower edge fitting within groove 21A and its left edge fitting within the righthand groove 22A, much in the manner of the previously described aligning parts $KD_1$ and $KC_1$. As also shown therein, a first ring $R_1$ has a hole 30 in its center for fitting closely over the upper end of rod 22, and a radial slot 31 of a width for fitting closely over the key $KR_1$ to permit it to be mounted on the support means in much the same manner as the cylinder $C_1$. $KR_1$ is of a height corresponding to the height of the ring $R_1$ so that its upper edge is in substantial alignment with the upper face of ring $R_1$.

Upon mounting of ring $R_1$, additional rings may be moved sequentially into mounted position on the support means, either as sets extending outwardly along the X axis, or as sets extending upwardly along the Y axis, or as combinations thereof. For example, a second ring $R_2$ has a central hole 32 therein which fits closely over the outer diameter of ring $R_1$, and a radial slot 33 which fits closely over an aligning part $KR_2$ which has been mounted on the support means in a manner similar to the aligning part $KC_2$. Another key $KR_3$ may then be mounted on the support means in preparation for mounting a third ring $R_3$ concentrically about ring $R_2$ as shown in broken lines in FIG. 6.

When all rings of the lowermost horizontal set have been mounted, vertically successive horizontal sets may be mounted on the support means. Alternatively, upon mounting of the lowermost horizontal set, vertically arranged sets may be mounted successively in an outward radial direction from the Y axis. As will thus be appreciated, the rings may thus be mounted in a number of ways starting with ring $R_1$ and building outwardly therefrom either in a horizontal or vertical direction. Preferably, and as shown, all but the outermost rings are of the same vertical and radial extent.

FIG. 7 shows the aid with the various solid forms of bodies replaced by plates $P_1$, $P_2$, $P_3$, $P_4$ and $P_5$ having outer edges which, upon rotation of the plates about the Y axis defined by the rod 21 upon which they are rotatably mounted, generate an imaginary geometrical shape. As shown, a sleeve 34 mounted on the inner end of each plate has a hole 35 therethrough for fitting closely over one end of the rod 21, so that plates $P_1$, $P_2$, $P_3$, $P_4$ and $P_5$ may be slid sequentially over the end of the rod 21 into the positions of FIG. 7.

Each plate is releasably keyed against rotation about the rod 21 by means of a ball detent 36 carried by the sleeve and normally urged by a coil spring 37 to a position for engaging in groove 21A extending along the top of the rod 21. More particularly, and as shown in FIG. 8, each ball and spring is contained within a socket 38 aligned with the plate so that, as each plate is assembled on the rod 21, it may be rotated into a position in which it is disposed vertically or parallel to the axis of the vertical rod 22. Thus, when mounted, the several plates are aligned with one another, as shown in FIG. 7.

Each spring 37 is relatively weak so that, upon application of a small turning force, each plate may be rotated about rod 21, either individually or with one or more of the other plates. Ordinarily, however, springs 37 maintain the detents in keying positions to hold all of the plates in the upright position of FIG. 7. Since the means for keying the plates to the support means does not require the slots in rod 22, such rod may be smooth, as shown in FIG. 7. However, if the rod is grooved, as shown in FIGS. 1 to 6, it permits the plates to be assembled thereon so as to illustrate a geometrical shape generated by the revolution of the curve defined by the outer edges of the plate about the Y axis.

As shown in FIGS. 9 to 11, several forms of the second embodiment of the invention may be provided on the walls of a box 40. Thus, a different form thereof is shown on each of the front wall 41, rear wall 42 and side wall 43 of the box, each such wall providing a support means including a rod mounted on the wall to define one axis and a line drawn on the extension of the wall to define the other axis of X and Y axes.

More particularly, a rod 41A is mounted within a journal 41B which extends horizontally from one side to the other of the wall 41 intermediate its upper and lower edges, a rod 42A is rotatably mounted within a journal 42B which extends horizontally across wall 42 intermediate its upper and lower edges, and a rod 43A is rotatably mounted within a journal 43B which extends vertically across wall 43 intermediate its opposite side edges. As shown in FIG. 9, a line 44 is drawn on the exterior of the wall 41 perpendicularly to the axis of pin 41A, and thus in a vertical direction parallel to the side edges of the wall.

Although not shown, a line is also drawn on the wall wall 42 perpendicularly to the axis of the pin 42A and thus in a vertical direction parallel to the upper and lower edges thereof. Thus, in the case of the walls 41 and 42, the rods define the X axis of the support means, and the drawn lines define the Y axis thereof, and in the case of the wall 43, the rod 43A defines the Y axis of the support means and the drawn line 45 the X axis of the support means.

Each of the walls 41, 42 and 43 is cut out along one side of the length of the rod so as to permit bodies mounted on the rods to be swung between positions within the box and outside of the box. Thus, when swung to their positions outside the box, the bodies on each such wall make up half of a geometrical shape generated by the revolution about the axis of the rod of a curve defined by the intersection of a plane through such axis with the outer surfaces of the bodies.

Thus, wall 41 is cut away to provide an opening 46 whose upper edge fits close about the outer edges of bodies 47 as they are swung between their inner and outer positions. The bodies 47 rotatably mounted on rod 41A are half discs each of which has an outer edge of different configuration. As shown, during use, certain of these bodies may be within the box, while others are outside of the box, whereby only a part of the geometrical shape is illustrated. The bodies are located within the box by engagement of the flat edge on one side of rod 41A with the inner side of the wall, and located outside the box by engagement of the flat edge on the other side of the rod with the outer side of the wall.

An opening 48 is formed in the wall 43 on the left side of rod 43A to pass bodies 49 of half ring shape as they swing about the rod between inner and outer positions with respect to the wall. As shown, the outer and inner diameters of the concentrically adjacent rings have tongue and groove sliding connections. As in the case of the half discs 47 on the wall 41, the half rings on the wall 43 may be moved between inner and outer positions either as a group or individually.

The bodies on wall 42 of the box comprise thin half discs 49A mounted for rotation about the rod 42A. Although its shape is not shown, an opening formed in the wall 42 to one side of the pivot pin 42A has an outermost edge conforming to the outermost edge of the segmental shape represented by the outer edges of the half discs.

The embodiment of the device illustrated in FIGS. 12 to 14 includes a support means, indicated in its entirety by reference character 50, which is similar to the support means of the first embodiment in that it comprises rods 51 and 52 connected at right angles to one another. The rods are mounted on a rectangular framework 53 whose opposite sides 56 and 57 are parallel to the rods 22 and 21 so that when the wall 57 is supported on a horizontal base 54, as shown in FIG. 12, rod 52 defines a Y axis and rod 51 an X axis. However, when the framework is turned so that a wall 56 is supported on base 54, as shown in FIG. 13, rod 51 defines a Y axis and rod 52 defines an X axis. When a wall 57 is supported on the base 54, it is secured thereto by means of footings 59 extending from lower wall 58 and secured to the base by screws 60, and when a wall 56 is supported thereon, it is secured thereto by screws 58.

As shown, the opposite end of rods 51 are supported by bearings 55 on walls 56, and the upper and lower ends of rod 52 are spaced from the walls 57 to permit the support means to be swung about the axis of rod 51. One end of the rod extends through its bearing and the wall 56 on which it's supported for connection with a motor 61 mounted on the outer side of the wall 56. The motor thus provides a means of rotating the rod and thus the support means at a desired speed.

A third rod is releasably connected at its opposite ends to the rods 51 and 52 of the support means, with its length intermediate the support means being bent to the shape of a curve which may be rotated about the axis defined by rod 51 to generate an imaginary geometrical shape. Thus, the upper end of rod 62 is releasably connected to rod 52 by means of a collar 63, and the lower end thereof is releasably connected to rod 51 by means of a collar 64. Each collar includes a sleeve which is slidable axially along the rod of the support means to which it is connected, and another sleeve which extends to one side thereof for receiving the end of the rod 62.

Each sleeve carries a set screw for releasably connecting it to the rod which it receives, so that, as will be appreciated, the collars may be adjusted along the lengths of the support rods to change the configuration of the curve defined by the third rod. Preferably, the rod 62 is made of lead so that it may be bent into a desired shape intermediate the sleeves of the collars to which it is connected. Furthermore, the set screws mounted on the sleeves for receiving the ends of the lead rod permit it to be quickly removed and replaced by another rod, if desired.

Equally spaced bands 65 extend vertically between the support rod 51 and the rod 62, whereby adjacent bands will move in paths which define the opposite sides of imaginary discs as rod 62 is rotated about the X axis. As shown, each band includes a ring at each end surrounding one of the rods 61 and 62. Preferably, the length of the band extending between hooks on the rings is of rubber to permit the effective lengths of the bands to be altered.

As indicated by broken lines, another rod 62 may be mounted between the collar 63 and a collar 64 releasably connected to the right end of rod 51. For this purpose, the collar 63 has sleeves on the opposite sides of the sleeve received over rod 52. The collar 64 is identical to the collar 64 previously described for receiving the lower end of lefthand rod 62. With the additional rod 62 so mounted, additional bands 65 may be extended between it and the righthand end of rod 51 to duplicate the geometrical shape illustrated by the left side.

As shown in FIG. 13, when the framework 53 is turned on end, rod 52 defines the X axis of the support means and rod 51 defines the Y axis thereof. As illustrated, the rod 62 may be replaced by another rod 67 of different length and bent to a different shape. Also, equally spaced bands 65 are arranged to extend vertically between rod 67 and support rod 52 so that adjacent bands will move in paths which define the inner and outer diameters of imaginary cylinders as rod 67 is rotated about the Y axis.

As previously described, the rods 62 and 67 are preferably made of lead which will normally retain its shape, but which may be bent into another shape which it would then retain. However, it may be desired to stabilize these rods by means of a spiral spring 68 wound thereabout. When so wound spring 68 serves an additional purpose in that the ring on the upper end of each of the bands 65 may fit between adjacent loops to limit its movement along the rod 62.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A visual aid for use in teaching applications in integral calculus, comprising support means defining X and Y axes, and a plurality of segmental shapes mounted on the support means to describe a geometrical shape which is generated by the revolution of an area bounded by a given curve about one of said axes.

2. An aid of the character defined in claim 1, wherein the support means includes a pair of rods which intersect at right angles, and the means representing the segmental shapes comprise bodies removably mounted on one of said rods.

3. An aid of the character defined in claim 2, wherein the bodies comprise discs which surround the rod on which they are mounted.

4. An aid of the character defined in claim 2, wherein the bodies comprise cylinders which surround the rod on which they are mounted.

5. An aid of the character defined in claim 2, wherein the bodies comprise rings of rectangular cross sections which surround the rod on which they are mounted.

6. An aid of the character defined in claim 2, wherein the bodies comprise plates which are rotatable about the rod on which they are mounted.

7. An aid of the character defined in claim 1, wherein the support means comprises a wall, a pivot pin mounted on the wall to define one axis, and a line on the wall defining the other axis, and the segmental shapes comprise bodies rotatable about said pin between positions on one side or the other of the wall.

8. An aid of the character defined in claim 1, wherein the support means comprises a pair of rods for rotation about its axis, and the segmental shapes comprise a third rod extending between the other rods of the support means, and bands extending parallel to one another between the third rod and one of said pair of rods.

9. An aid of the character defined in claim 8, wherein said third rod is deformable to a desired shape, and the bands are elastic.

* * * * *